UNITED STATES PATENT OFFICE.

HENRY LIVINGSTONE SULMAN AND HUGH FITZALIS KIRKPATRICK PICARD, OF LONDON, ENGLAND, ASSIGNORS TO MINERALS SEPARATION AMERICAN SYNDICATE (1913) LIMITED, OF LONDON, ENGLAND.

COPPER PRECIPITANT.

1,178,191.  Specification of Letters Patent.  Patented Apr. 4, 1916.

No Drawing. Original application filed December 27, 1913, Serial No. 808,986. Divided and this application filed June 15, 1914. Serial No. 845,086.

*To all whom it may concern:*

Be it known that we, HENRY LIVINGSTONE SULMAN and HUGH FITZALIS KIRKPATRICK PICARD, subjects of the King of England, and both residing at London, England, have invented certain new and useful Improvements in Copper Precipitants, of which the following is a specification.

This invention is for improvements in copper precipitants and relates to the production of a precipitant containing sulfur and adapted to precipitate copper as sulfid from solutions of copper obtained in any metallurgical or mining operation, and this application is a division of our application Serial No. 808,986, filed December 27, 1913.

It is known that ferrous sulfid (FeS) will precipitate copper from its solutions $$(CuSO_4 + FeS = CuS + FeSO_4)$$

the iron replacing the copper in solution. Pyrites ($FeS_2$) does not act as an efficient precipitant, but on heating this compound in such a manner as to eliminate some sulfur, iron sesqui-sulfids and iron monosulfid are formed, but the conversion of pyrites into the monosulfid or ferrous sulfid (FeS) is difficult to obtain with completeness.

We have found that by heating pyrites (either simple $FeS_2$ or copper pyrites such as chalcopyrite or bornite) with an equivalent of lime to a low red heat and cooling out of contact with air, a much more powerful and efficient precipitant for copper solutions is formed. This precipitant contains both ferrous sulfid and calcium sulfid. This material when powdered and stirred with copper bearing solutions separates the copper as sulfid which in a short time falls as a precipitate, and may be collected from the liquors by any suitable means. In some cases the application of heat may be useful in facilitating and accelerating the separation of the copper sulfid.

The reaction on heating pyrites and lime may be represented by the equation:

$$4FeS_2 + 4CaO = 4FeS + 3CaS + CaSO_4$$

and the precipitation reaction as $$7CuSO_4 + 4FeS + 3CaS = 7CuS + 4FeSO_4 + 3CaSO_4$$

or pyritic copper concentrates may be similarly heated with lime and the resulting material used for copper precipitation.

According to a modified method, the pyrites or copper pyrites (or material containing one of these) and lime are mixed with carbon in quantity equivalent to the oxygen present in the other ingredients of the charge and this mixture is heated so as to produce ferrous sulfid and calcium sulfid according to the following equation for example:

$$FeS_2 + CaO + C = FeS + CaS + CO$$

and by this means all the sulfur originally present is put into a condition wherein it may be utilized for the precipitation of soluble copper as copper sulfid.

The carbon employed may be finely pulverized coal, charcoal, soot, lamp-black, flour or any suitable form of carbonaceous material. The mixture of lime, pyrites and carbon may advantageously be balled or briqueted with a small proportion of wood tar or other tar, or thick oil or other suitable carbonaceous binding medium, before heating.

We find that the precipitation of copper sulfid from copper-bearing solutions such as copper sulfate by this precipitant proceeds best in slightly acidified solutions. The method of operation may consist in stirring in to the requisite quantity of solution the equivalent of powdered precipitant, allowing a sufficient time for the copper precipitate to form and subside. It is evident that this may be effected in continuously acting apparatus or plant. If the powered precipitant be duly measured by means of an automatic feed and if known types of settlement apparatus or separation apparatus be subsequently used, the treatment of copper liquors for the recovery of copper as sulfid becomes automatic and continuous. Or if desired the copper-bearing liquors may be percolated through an excess of the granular precipitant in suitable vessels, the contents of which when fully charged with precipitated copper sulfid may be washed clean therefrom, or smelted direct or the contained copper recovered by any other suitable means. We however prefer the direct precipitation method before described which is more economical and more easily applied than the method of precipitation of copper solution by scrap-iron ("cementation") now generally employed.

It is to be noted that the calcium sulfid in the precipitant is effective for precipitating the copper sulfid and therefore by the addition of lime to the pyrites before heating it becomes nearly twice as efficient as a precipitant as pyrites heated without lime.

What we claim as our invention and desire to secure by Letters Patent is:—

1. A method of preparing a precipitant for copper which consists in heating pyrites with lime so as to produce a precipitant containing a mixture of ferrous sulfid and calcium sulfid.

2. A method of preparing a precipitant for copper which consists in heating pyrites with lime and carbon so as to produce a precipitant containing ferrous sulfid and calcium sulfid.

3. A method of preparing a precipitant for copper which consists in heating copper pyrites with lime so as to produce a precipitant containing ferrous sulfid and calcium sulfid.

4. A method of preparing a precipitant for copper which consists in heating copper pyrites with lime and carbon so as to produce a precipitant containing ferrous sulfid and calcium sulfid.

5. A precipitant for copper containing a mixture of ferrous sulfid and calcium sulfid.

In testimony whereof we have signed our names to this specification in the presence of two subscribing witnesses.

HENRY LIVINGSTONE SULMAN.
HUGH FITZALIS KIRKPATRICK PICARD.

Witnesses:
WILLIAM H. BALLANTYNE,
STANLEY JOHN HELE.